US007028132B2

(12) United States Patent
Riley

(10) Patent No.: US 7,028,132 B2
(45) Date of Patent: Apr. 11, 2006

(54) DISTRIBUTED PEER-TO-PEER COMMUNICATION FOR INTERCONNECT BUSSES OF A COMPUTER SYSTEM

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 09/967,607

(22) Filed: Sep. 29, 2001

(65) Prior Publication Data

US 2003/0065868 A1 Apr. 3, 2003

(51) Int. Cl.
*G06F 13/36* (2006.01)
(52) U.S. Cl. ..................................... 710/311; 710/315
(58) Field of Classification Search ................ 710/306, 710/308–317, 305, 100, 22
See application file for complete search history.

(56) References Cited

U.S. PATENT DOCUMENTS 5,826,034 A * 10/1998 Albal ............................ 79/239
6,557,068 B1 * 4/2003 Riley et al. ................. 710/306
6,651,122 B1 * 11/2003 Porterfield .................. 710/100
2003/0009432 A1 * 1/2003 Sugahara et al. ............... 707/1
2004/0044820 A1 * 3/2004 Ajanovic et al. ........... 710/305

OTHER PUBLICATIONS

Erlanger, "High-performance buses and interconnects", PC Magazine, Nov. 8, 2001, 21 pp (http://www.extremetech.com/print_article/0, 1583,a=18058,00.asp).*

* cited by examiner

*Primary Examiner*—Tim Vo
*Assistant Examiner*—Clifford Knoll

(57) ABSTRACT

Distributed peer-to-peer transactions are defined on an interconnect bus of a computer system according to an interconnect protocol. The transactions contain a completer device attribute data and a self-defining payload data. The transaction is identified as a peer-to-peer transaction by a command or an attribute data in the transaction. The transaction can be routed across a hierarchy of interconnect bus segments using the completer device address data. A handle can be used by an operating system of the computer system to indicate permission for the peer-to-peer transaction. Address information in a completer device address space can be provided within the peer-to-peer transaction or by a completer device driver for use by the completer device in processing the peer-to-peer transaction.

37 Claims, 8 Drawing Sheets

FIG. 6A (Prior Art)

| Bits | Field |
|---|---|
| 35:32 | Upper Byte Count (C/BE[3:0]#) |
| 31 | R |
| 30 | NS |
| 29 | RO |
| 28:24 | Tag |
| 23:16 | Requester Bus Number |
| 15:11 | Requester Device Number |
| 10:08 | Requester Function Number |
| 07:00 | Lower Byte Count |

| Bits | Field |
|---|---|
| 35:32 | Byte Enables (C/BE[3:0]#) |
| 31 | R |
| 30 | NS |
| 29 | RO |
| 28:24 | Tag |
| 23:16 | Requester Bus Number |
| 15:11 | Requester Device Number |
| 10:08 | Requester Function Number |
| 07:00 | Reserved |

AD[31:0]

DISTRIBUTED PEER-TO-PEER COMMUNICATION FOR INTERCONNECT BUSSES OF A COMPUTER SYSTEM

CROSS-REFERENCE TO RELATED APPLICATIONS

This application is related to the following commonly owned U.S. patents and patent applications, which are hereby incorporated in their entirety by reference for all purposes:

U.S. Pat. No. 6,266,731, entitled "HIGH SPEED PERIPHERAL INTERCONNECT APPARATUS, METHOD AND SYSTEM," by Dwight Riley and Christopher J. Pettey; and U.S. patent application Ser. No. 09/967,606, entitled "Isochronous Transactions for Interconnect Busses of a Computer System," by Dwight D. Riley, filed concurrently.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention is related to interconnect busses of computer systems and in particular to distributed peer-to-peer communications across such interconnect busses.

2. Description of the Related Art

Many computer systems use interconnect busses for multiple types of traffic. In addition, other embedded digital systems use interconnect busses for connecting devices in the embedded digital system. One type of interconnect traffic that would be useful is distributed peer-to-peer transactions. Although existing interconnect protocols such as PCI-X can be used for peer-to-peer traffic, interconnect transactions today are typically processor to peripheral device transactions, for security and other reasons. Existing operating systems typically do not enable devices to communicate with each other directly across interconnect busses.

Further, multiple devices and types of devices can connect to an interconnect bus. However, each device and type of device typically uses a device-specific or type-of-device-specific data format, which may be different between the devices wishing to communicate. The conventional solution again uses processor-to-device transactions, with data moving from one device to the processor. The processor then moves the data from one buffer to another, converting the data as necessary, based upon pre-existing knowledge of the data formats of each device. Such a technique increases processor overhead and increases memory usage requirements.

In addition, moving data through the processor adds processor latency to the interconnect bus latency, increasing the time needed to send data from one device to another. Thus, performance overhead is increased without peer-to-peer transactions. Also, creation of new devices or data formats has typically required operating system modifications, which can significantly delay the ability to use a new device, and increases the complexity and length of time to develop device drivers.

BRIEF SUMMARY OF THE INVENTION

A disclosed technique provides for distributed peer-to-peer transactions between a requester device and a completer device over an interconnect bus of a computer system operating according to an interconnect protocol. Completer device address data is inserted into the distributed peer-to-peer transaction. A self-defining payload data is inserted into a data phase of the distributed peer-to-peer transaction. The distributed peer-to-peer transaction is then sent across the interconnect bus from the requester device to the completer device, according to an interconnect protocol.

In one embodiment, a peer-to-peer command is inserted into a command phase of the distributed peer-to-peer transaction. In another embodiment, an attribute is set in an attribute phase of the distributed peer-to-peer transaction, indicating the transaction is a distributed peer-to-peer transaction.

In another embodiment, the completer device address data includes a bus identifier and a device identifier associated with the completer device. In a further embodiment, the completer device address data includes a function identifier associated with the completer device.

In one embodiment, the interconnect protocol is the PCI-X protocol.

In one embodiment, the distributed peer-to-peer transaction is routed across a hierarchy of interconnect bus segments using the completer device address data inserted into the distributed peer-to-peer transaction.

In another embodiment, an operating system of the computer system provides a handle to indicate permission by the operating system for peer-to-peer transactions between the requester device and the completer device, inserting the handle into the data phase of the distributed peer-to-peer transaction. In a further embodiment, the requester device requests the handle from the operating system prior to sending the distributed peer-to-peer transaction. In another further embodiment, the completer device requests the handle upon receiving a distributed peer-to-peer transaction from the requester device.

In a disclosed embodiment, the self-defining payload data includes an information field and a definition field, the definition field providing structure and content definition data for the information field. The self-defining payload data can be converted by the completer device from a distributed peer-to-peer transaction format and structure into a completer device format and structure. In one embodiment, the presence of the self-defining payload data is indicated in the attribute phase of the transaction.

Another embodiment inserts an address in a completer device address space into the data phase of a distributed peer-to-peer transaction.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which:

FIGS. 6A–6B are block diagrams of conventional PCI-X requester attribute data;

DETAILED DESCRIPTION OF THE INVENTION

The present invention provides a technique for enhancing the operation of computer system busses that use the extensions to the peripheral component interconnect specification (hereinafter PCI-X busses), as well as logic circuits and signal protocols thereof. For illustrative purposes, embodiments are described herein for computer systems using Intel Corporation microprocessor architectures, and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X busses, other bus architectures and protocols, such as the 3GIO bus architecture and protocol being promoted by Intel Corporation, Compaq Computer Corporation, Microsoft Corporation, IBM Corporation, and Dell Computer Corporation, could also be used.

Figure 1:
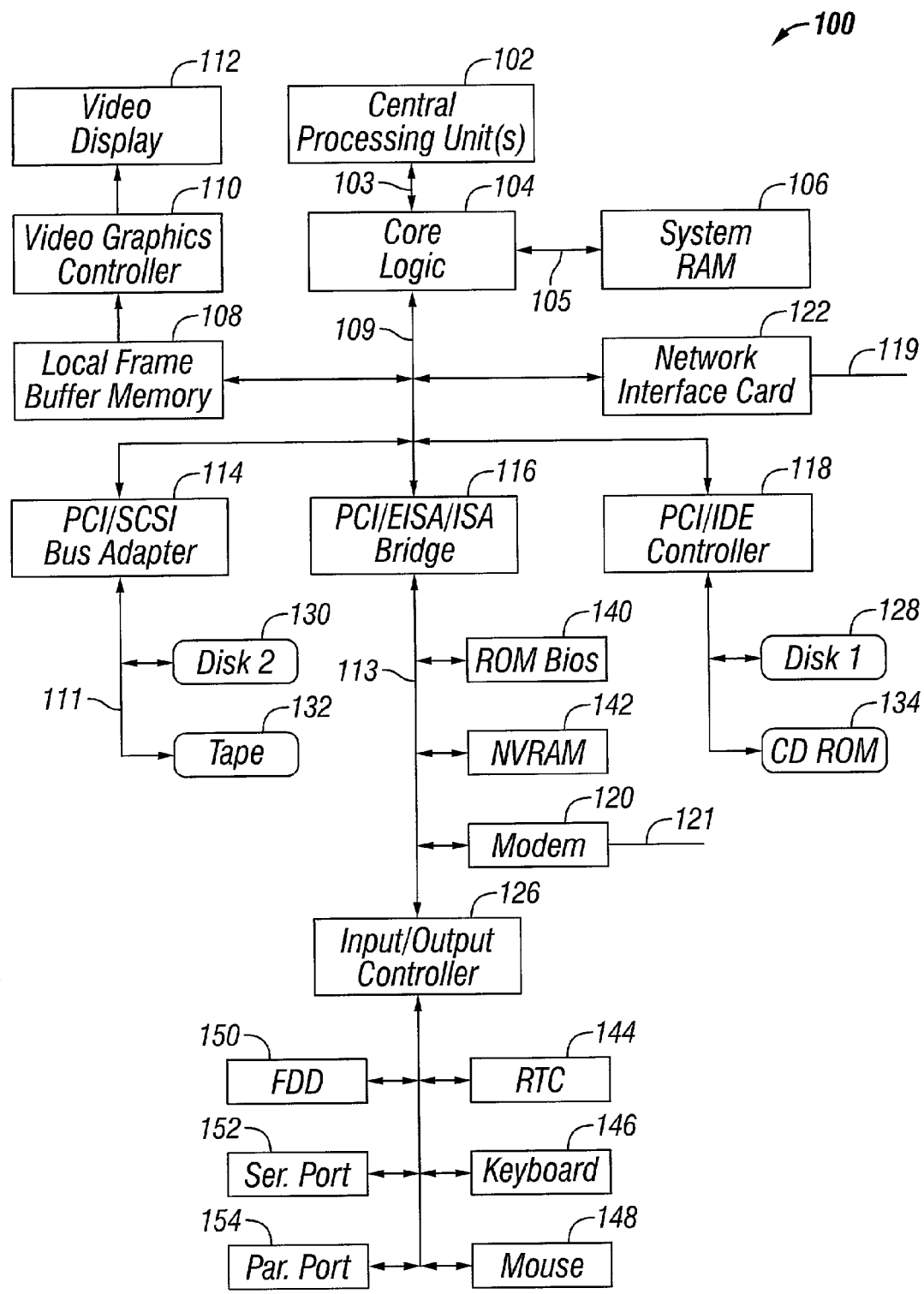
FIG. 1 is a schematic block diagram of a computer system in accordance with an embodiment of the invention.

Referring to FIG. 1, an exemplary schematic block diagram illustrates a computer system according to a disclosed embodiment. The computer system is generally indicated by the numeral 100 and comprises central processing unit(s) (CPU) 102, core logic 104, system random access memory (RAM) 106, a video graphics controller 110, a local frame buffer 108, a video display 112, a PCI/SCSI bus adapter 114, a PCI/EISA/ISA bridge 116, a PCI/IDF controller 118, and, optionally, a network interface card (NIC) 122. Single or multilevel cache memory (not illustrated) may also be included in the computer system 100 according to the current art of microprocessor computer systems. The CPU 102 may be a plurality of CPUs 102 in a symmetric or asymmetric multi-processor configuration.

The CPU 102 is connected to the core logic 104 through a CPU host bus 103. The system RAM 106 is connected to the core logic 104 through a memory bus 105. The core logic 104 includes a host-to-PCI bridge between the host bus 103, the memory bus 105 and a PCI-X bus 109. More than one PCI-X bus is contemplated herein as well as PCI-X-to-PCI-X bridges (not illustrated), and is within the scope and intent of the present invention. The local frame buffer 108 is connected between the video graphics controller 110 and the PCI-X bus 109. The PCI/SCSI bus adapter 114, PCI/EISA/ISA bridge 116, PCI/IDE controller 118 and the NIC 122 are connected to the PCI-X bus 109. Some of the PCI-X devices such as the video controller 110 and NIC 122 may plug into PCI connectors on the computer system 100 motherboard (FIG. 2).

Hard disk 130 and tape drive 132 are connected to the PCI-X/SCSI bus adapter 114 through a SCSI bus 111. The NIC 122 may be connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive (FDD) 150, serial port 152, and parallel port 154. The EISA/ISA bus 113 is a slower information bus than the PCI-X bus 109 with lower interface costs.

When the computer system 100 is first turned on, start-up information stored in the ROM BIOS 140 is used to begin operation thereof. Basic setup (BIOS) instructions are stored in the ROM BIOS 140 so that the computer system 100 can load more complex operating system (OS) software from a memory storage device, such as the disk 130. Before the operating system software can be loaded, however, certain hardware in the computer system 100 is configured to properly transfer information from the disk 130 to the CPU 102. In the computer system 100 illustrated in FIG. 1, the PCI/SCSI bus adapter 114 is configured to respond to commands from the CPU 102 over the PCI-X bus 109 and transfer information from the disk 130 to the CPU 102 via busses 109 and 103. The PCI/SCSI bus adapter 114 is a PCI-X device and remains platform independent. Therefore, separate hardware independent commands are used to setup and control any PCI-X device in the computer system 100. These hardware independent commands, however, are located in PCI-X BIOS contained in the computer system ROM BIOS 140. The PCI-X BIOS is firmware that is hardware specific but meets the general *PCI Local Bus Specification, Revision* 2.2 (the PCI specification) together with the general *PCI-X Addendum to the PCI Local Bus Specification* 1.0 (the PCI-X specification), both of which are incorporated by reference herein in their entirety. Plug and play and PCI devices (both PCI and PCI-X) in the computer system are detected and configured when a system configuration program is executed. The results of the plug and play and PCI-X device configurations are stored in the NVRAM 142 for later use by the startup programs in the ROM BIOS 140 and the PCI-X BIOS that configure the necessary computer system 100 devices during startup. Also during startup a "built-in-self-test" (BIST) may do diagnostic testing of components, such as PCI-X devices, in the computer system.

Figure 2:
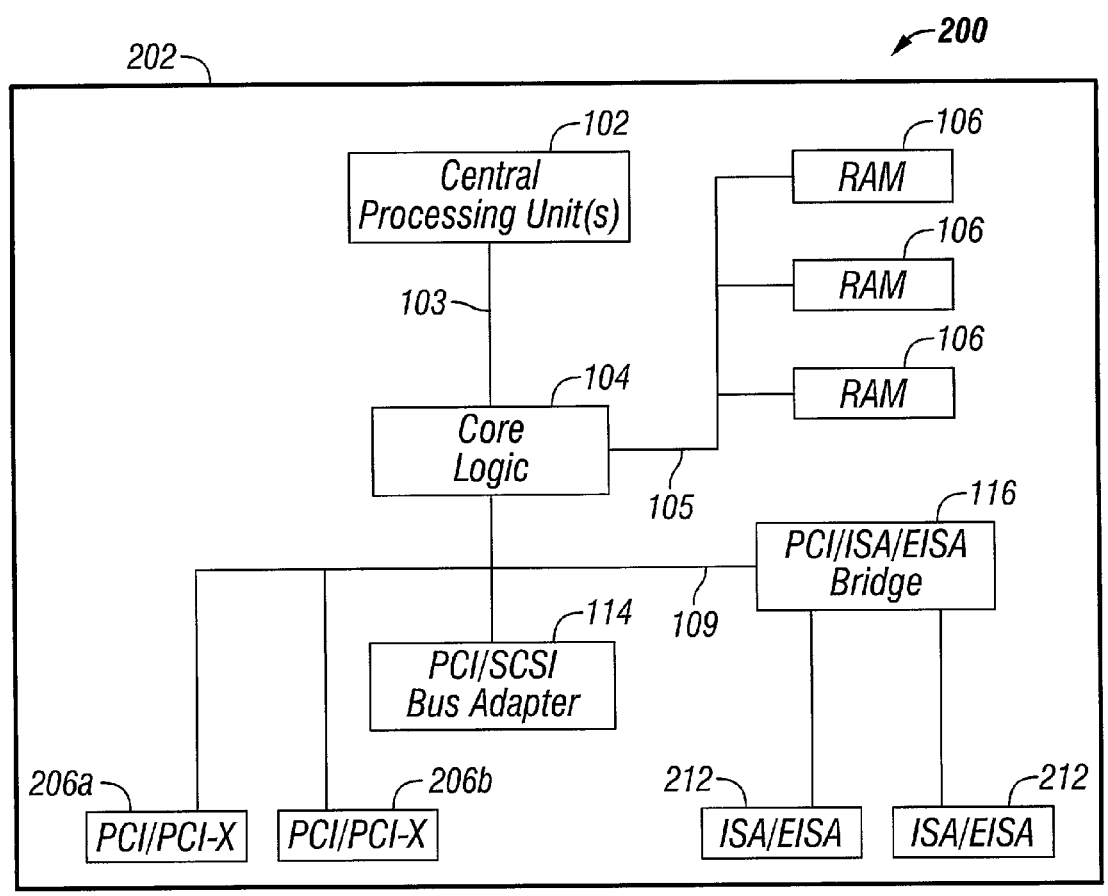
FIG. 2 is a schematic diagram of a printed circuit motherboard of the computer system of FIG. 1.

Referring to FIG. 2, a schematic diagram of an exemplary computer system motherboard according to FIG. 1 is illustrated. The computer system motherboard 200 comprises printed circuit board 202, on which components and connectors are mounted thereto. The printed circuit board 202 comprises conductive printed wiring used to interconnect the components and connectors thereon. The conductive printed wiring (illustrated as busses 103, 105 and 109) may be arranged into signal busses having controlled impedance characteristics. Illustrated on the printed circuit board are the core logic 104, CPU(s) 102, RAM 106, embedded PCI/ISA/EISA bridge 116, ISA/EISA connectors 212, embedded PCI/SCSI bus adapter 114, and PCI/PCI-X connectors 206a, 206b (connectors are the same for PCI and PCI-X). The motherboard 200 may be assembled into a case with a power supply, disk drives, etc. (not illustrated), which comprise the computer system 100 of FIG. 1.

Figure 3:
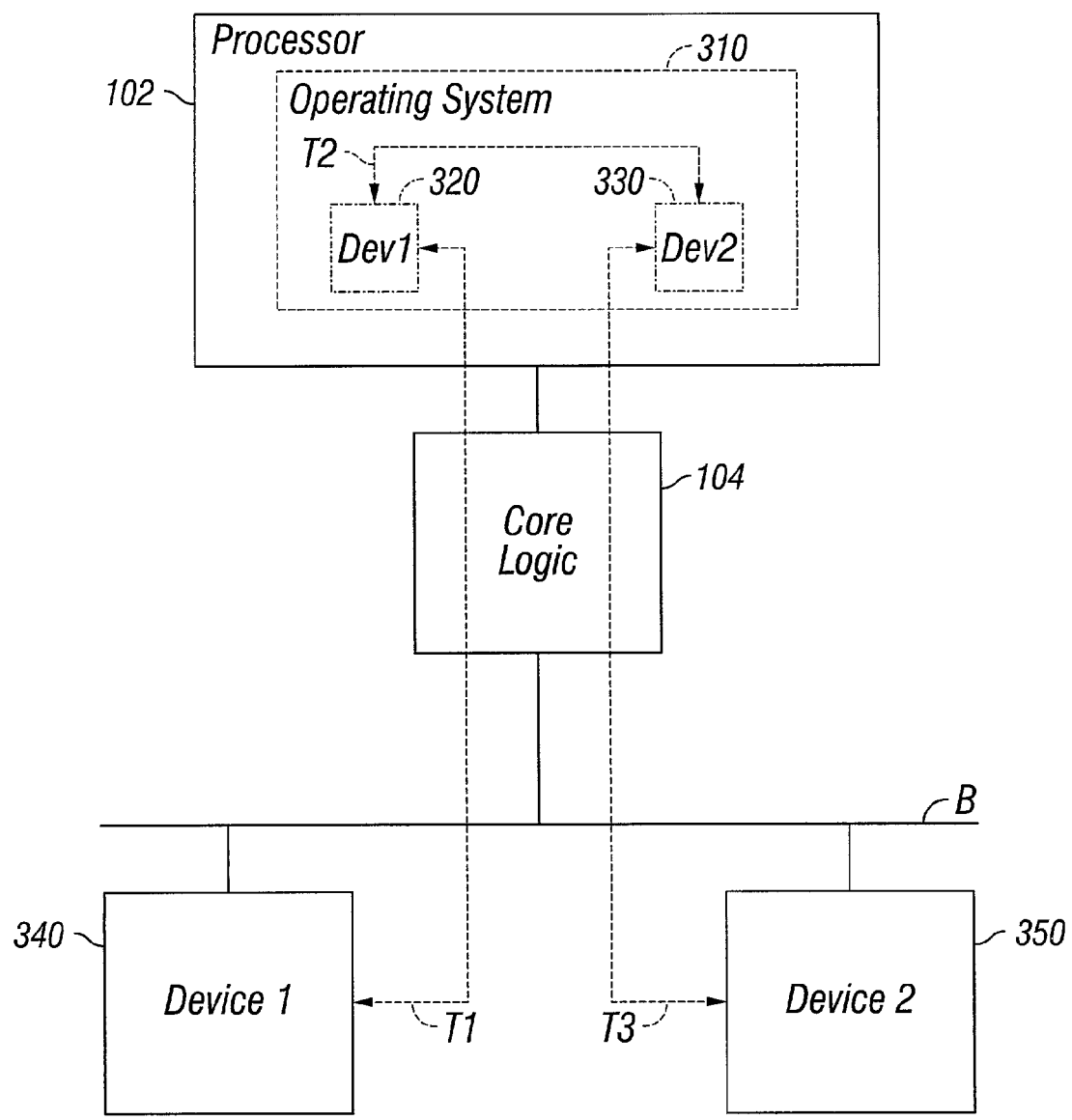
FIG. 3 is a block diagram illustrating data flow in a conventional processor-to-peripheral transaction.

As described above, conventional interconnect busses do not typically use peer-to-peer transactions. FIG. 3 is a block diagram illustrating the conventional technique for moving data from one device to another. A first device 340 communicates with a second device 350 by using the processor 102 as an intermediary. Device 340 and the processor 102 will send transactions across the interconnect bus B through the core logic 104, using a device driver 320 of the operating system 310, as indicated by arrow T1. Then the processor 102 will copy the data from a buffer associated with device driver 320 to a buffer associated with device driver 330, as shown by arrow T2. Finally, the processor 102 and the device 350 will communicate over the interconnect bus through the core logic 104, as shown by arrow T3.

Figure 4:
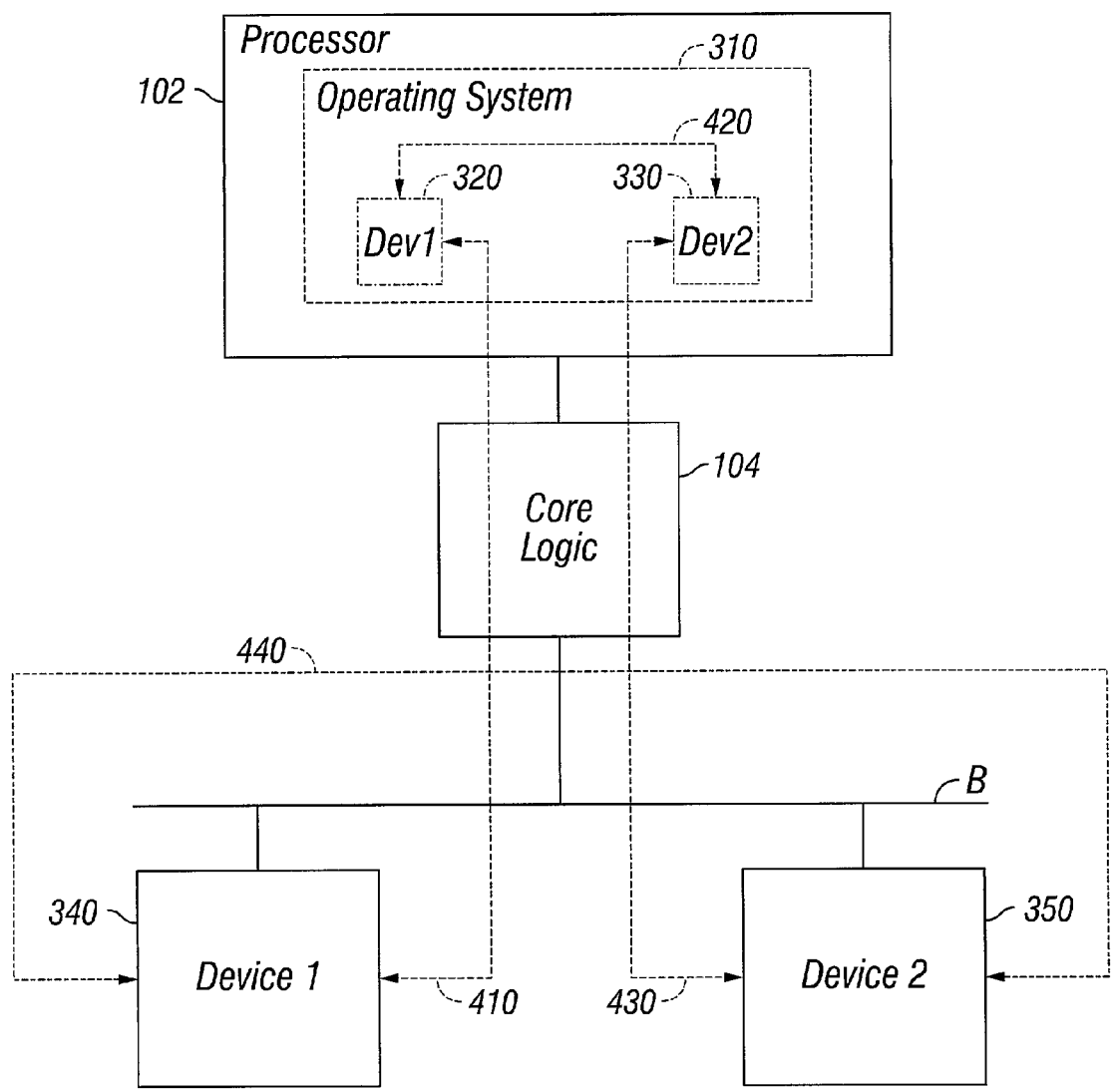
FIG. 4 is a block diagram illustrating data flow in a peer-to-peer transaction according to a disclosed embodiment.

In contrast, FIG. 4 is a block diagram illustrating a disclosed embodiment using peer-to-peer transactions. In this embodiment, device 340 issues a transaction to the processor 102 across the interconnect bus B via the core logic 104. A device driver 320 then obtains a handle in transaction 410, indicating the operating system 310 has given permission for peer-to-peer transactions between device 340 and device 360. The operating system 310 may inform device driver 330 of the request for a handle in transaction 420, allowing the device driver 330 to inform the device 350 in transaction 430 of the forthcoming peer-to-peer transactions, including sending the handle to the device 350. The device 340 then initiates a peer-to-peer transaction 440 across the interconnect bus B directly with the device 350. Although not shown in this FIG. 4, the peer-to-peer transaction 440 may cross between bridged bus segments of an interconnect bus hierarchy, if the device 340 and the device 350 are on different bus segments. In a disclosed embodiment, the handle is inserted into an attribute phase of the peer-to-peer transaction. In another embodiment, the handle is inserted into the data phase of the peer-to-peer transaction.

In another embodiment, transactions 420 and 430 are initiated at the request of the device 350 upon receipt of the peer-to-peer transaction 440 from device 340.

Figure 5:
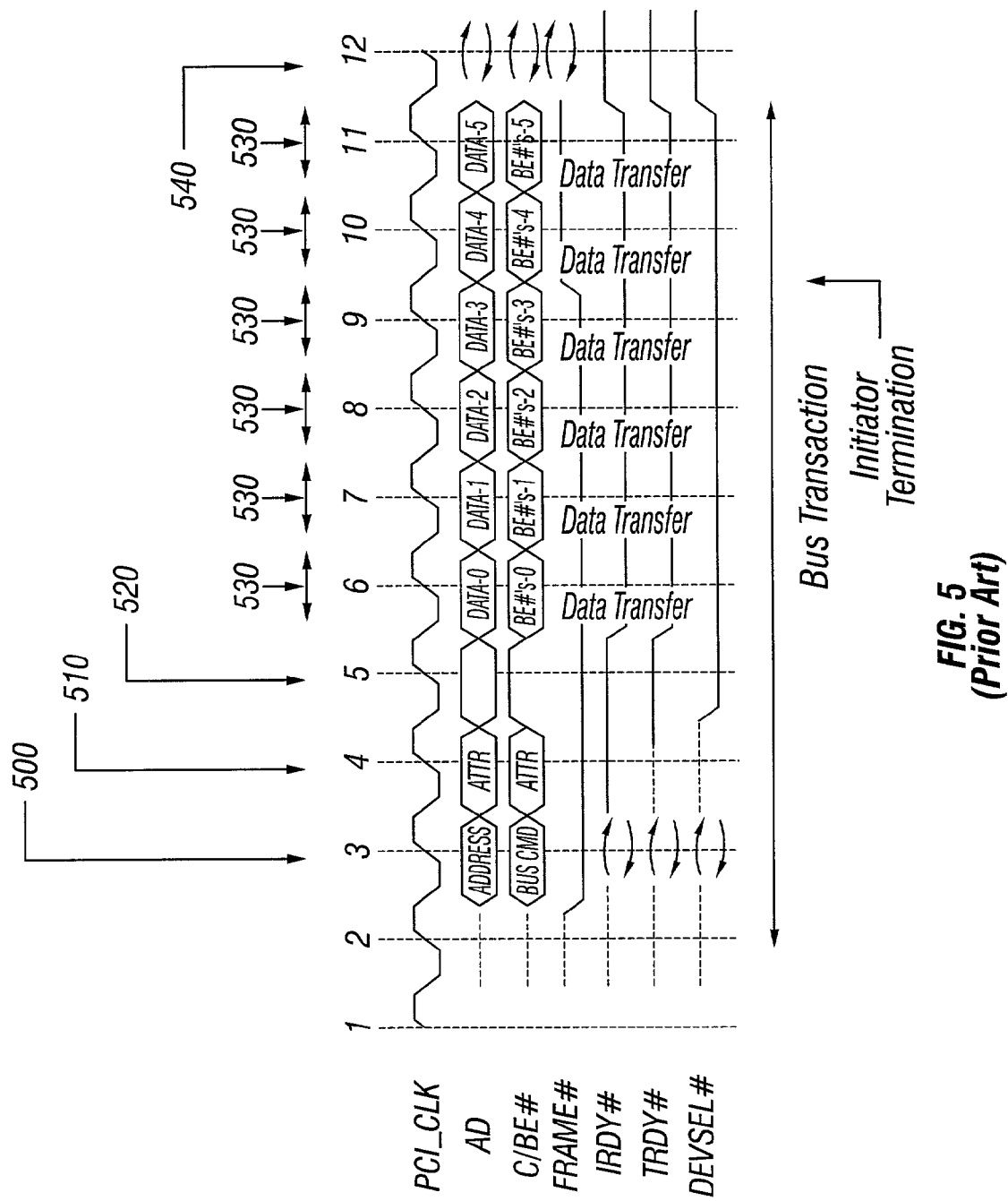
FIG. 5 is a timing diagram of a conventional PCI-X transaction.

FIG. 5 shows a timing diagram of a conventional burst write transaction according to the PCI-X protocol. An address phase of the transaction 500 provides an address data on the AD portion of the bus, while a command is inserted into a C/BE# portion of the bus. An attribute phase 510 follows, with attribute data on both the AD and C/BE# portions of the bus. The completer device accepts the transaction in completer response phase 520, followed by a series of data phases 530, in which a byte enable value is inserted into the C/BE# portion of the bus, corresponding to a payload data inserted into the AD portion of the bus. Finally, in step 540, the bus is turned around for a next transaction. Although FIG. 5 shows a burst write transaction, the PCI-X protocol allows other forms of transactions, which differ in the number of data phases 530 and the contents of the C/BE# portion of the bus during those data phases 530.

Turning to FIGS. 6A–6B, a conventional attribute phase for a PCI-X transaction is shown. FIG. 6A illustrates a byte-enable transaction, while FIG. 7B illustrates a DWORD transaction. Note that bits AD[31:8] are common between these forms. The attribute data of FIGS. 6A–6B show a requester function number in bits AD[10:8], a requester device number in bits AD[15:11], and a requester bus number in bits AD[23:16]. A reserved bit is shown in AD[31:31].

Figure 7:
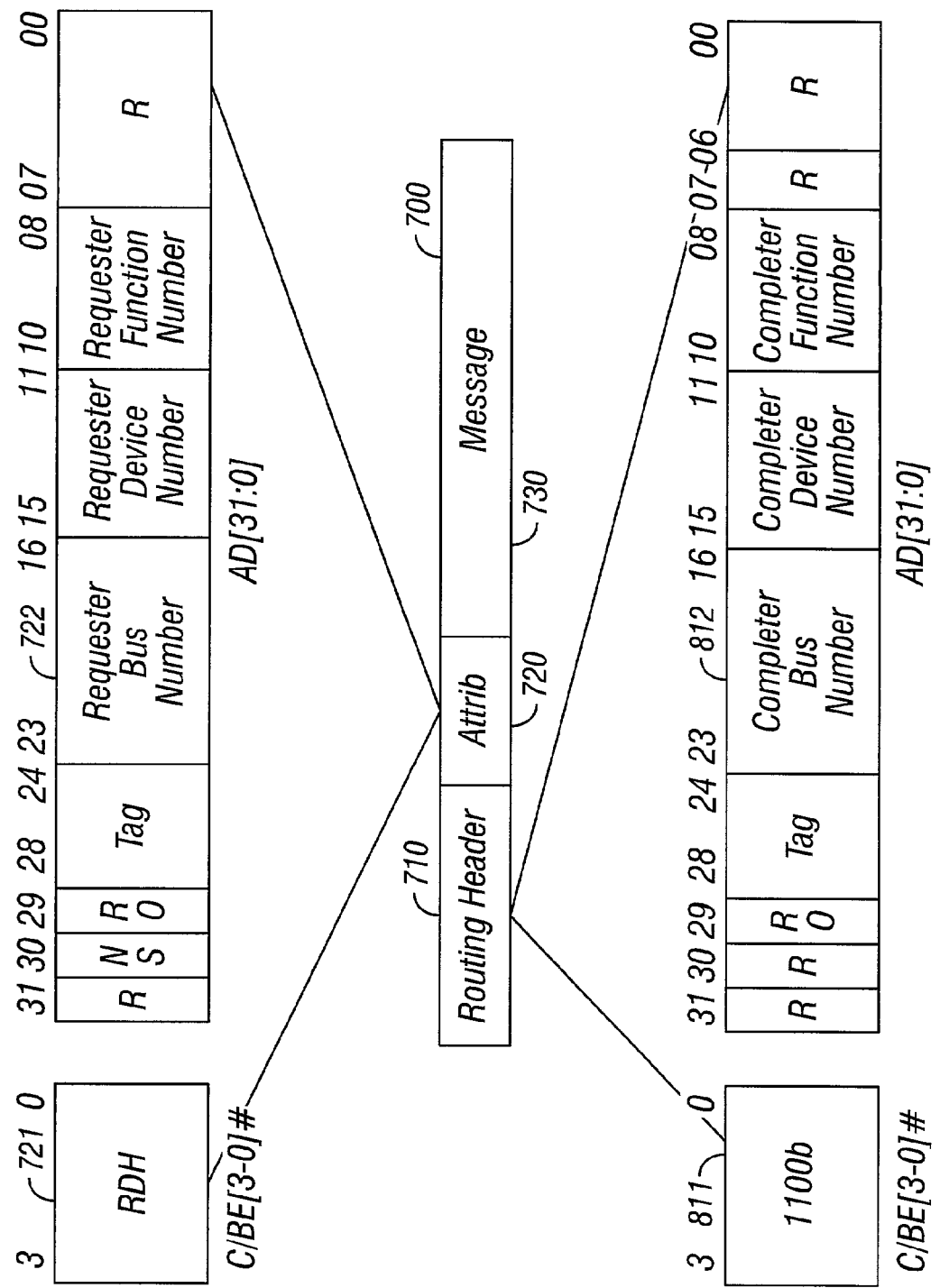
FIG. 7 is a block diagram of a peer-to-peer transaction according to a disclosed embodiment.

This attribute data serves to identify the requester device 340, including its location in an interconnect bus hierarchy, allowing the completer device 350 to identify the requester device 340. However, most conventional PCI-X transactions do not identify the completer device 350's location in the interconnect bus hierarchy using bus number, device number, and function number, as with the requester attribute data, but use a memory-mapped address in the address phase. According to one embodiment, a peer-to-peer transaction is routed to the completer using the completer's bus number, device number, and function number, as provided by the operating system or the requester's device driver, in the address phase of the transaction as illustrated in FIG. 7, discussed below. This completer device address data provides the location of the completer device in the interconnect bus hierarchy directly, equivalent to the conventional requester attribute data of FIGS. 6A–6B.

As shown in FIG. 7, a peer-to-peer transaction according to a disclosed embodiment uses the command defined as Split Completion in the PCI-X Specification, indicated as 1100b on the C/BE# lines during the address phase. In one embodiment, one of the reserved bits of field 712, for example bit AD[31:31], marked with "R" in FIG. 7, identifies the transaction as a peer-to-peer transaction instead of a Split Completion transaction. Other reserved bits can be used to distinguish the Split Completion format from a peer-to-peer command. Further, other arrangements of the field 712 can be used. Other techniques for indicating the transaction as a peer-to-peer transaction can be used.

Field 722 contains requester attribute information, as in conventional PCI transactions. Field 721 is shown as reserved driven high ("RDH"). The reserved bits of field 721 and 722 can be assigned as desired to indicate special kinds of peer-to-peer transactions. For example, isochronous transactions as described in the related application 09/967,606 entitled "Isochronous Transactions for Interconnect Busses of a Computer System," previously incorporated by reference, can use on of these reserved bits to indicate an isochronous peer-to-peer transaction.

Figure 8:
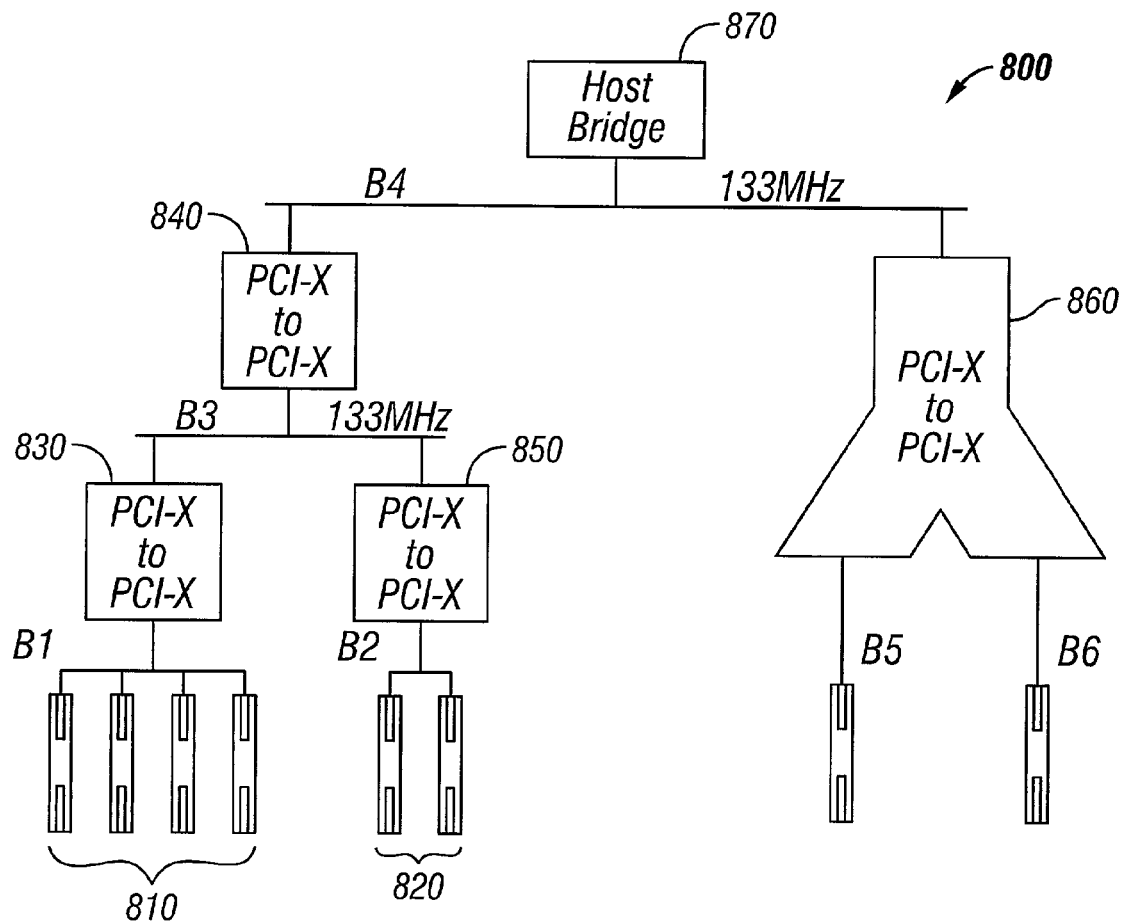
FIG. 8 is a block diagram illustrating a hierarchy of PCI-X bus segments.

One use for the routing header 710 of FIG. 7 is for routing a peer-to-peer transaction across multiple bus segments of an interconnect bus hierarchy. As shown in FIG. 8, a requester 810 is on bus segment B1, while completer 820 is on bus segment B2. Peer-to-peer transactions between requester 810 and completer 820 must traverse the bus hierarchy 800 through bridges 830 and 850 which are connected to bus segment B3. The routing header 710 identifies the completer device and completer bus segment for bridges 830 and 850, allowing the peer-to-peer transaction to be routed across the bus hierarchy 800 appropriately. A PCI-X bridge uses this field 710 to identify transactions to forward. If the bus number field of this routing header 710 on the secondary bus is not between the bridge's secondary bus number and subordinate bus number, inclusive, the bridge forwards the transaction upstream. If the bus number field of this routing header 710 on the primary bus is between the bridge's secondary bus number and subordinate bus number, inclusive, the bridge forwards the transaction downstream. If the bridge forwards transaction to another bus operating in PCI-X mode, it leaves the routing header 710 unmodified.

Figure 9:
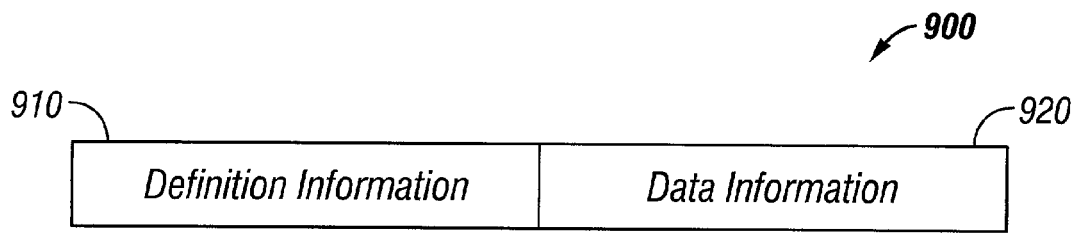
FIG. 9 is a block diagram illustrating a self-identifying payload data according to one embodiment.

Turning to FIG. 9, a block diagram illustrates the use of a self-defining payload data in the data phase(s) of a peer-to-peer transaction according to a disclosed embodiment. Although as discussed herein the self-defining payload data is used in peer-to-peer transactions, transactions between a peripheral and a host can also use a self-defining payload data. The self-defining payload data allows the completer device to strip out certain data that it does not need. For example, a requester device may have breaks in the data that are not needed for the completer device. Therefore, the self-defining payload data allows the completer device to understand the format, structure, and content of the payload data so that it can interpret the payload data, allowing the completer device to strip out pieces that it does not need or perform other desired manipulations of the payload data. Further, a self-defining data format allows devices have their own data format, which can be unique and private between the device and its associated device driver, to specify the data in a peer-to-peer transaction in a standard self-defining payload data format. The use of a self-defining payload data format allows requester and completer devices to convert from the self-defining payload data format to their native data format. Self-defining data is well-known in the art. Examples of techniques for providing self-defining data are the Extensible Markup Language (XML) defined by the World Wide Web Consortium. Another example of a well-known self-defining data format is the Abstract Syntax Notation 1 (ASN.1) defined by the International Standards Organization (ISO). Other self-defining data formats are known in the art and could be used. Although self-defining data formats are well-known in the art, they have not previously been used in interconnect protocols.

As shown in FIG. 9, a payload data field 900 contains a definition information field 910 and a data information field 920. The definition information field 910 contains information regarding the structure and type of data contained in the data information field 920 sufficient to allow the data information 920 to be interpreted. The specific technique used to encode or define the data information is not significant. Although shown as two separate fields, the definition information and the data information may be intermixed, depending upon the self-defining data technique used.

In one embodiment, the self-defining payload data can contain an address in a requester device address space for the data contained in the self-defining payload data. Conventional PCI-X devices use a shared PCI-X address space, into which the PCI-X devices are mapped. In peer-to-peer transactions according to a disclosed embodiment, the completer device can use an address in the completer device's address space to specify where the data contained in the self-defining payload data is to be stored on the completer device, such as the address of a buffer of the completer device. The completer device in one embodiment can obtain that information from its device driver. In another embodiment, a completer device can associate an address in the completer device's address space with an requester device, such that peer-to-peer transactions from the requester device will place data in the associated completer device address space location. In another embodiment, the completer device and/or the requester device can negotiate the completer device address space address with the operating system. In another embodiment, an attribute in the attribute phase can indicate that the payload data contains an address in the completer address space.

In one embodiment, the presence of a self-defining payload data format in the data phase of a transaction is identified by use of a bit in the requester attribute data field of the transaction, such as the AD[31:31] bit marked with an "R" as reserved in FIGS. 7A and 7B. Setting this bit indicates the payload data of the data phase is in the self-defining data format. Other bits could be used to indicate the presence of a self-defining payload data format, such as one of the C/BE# bits marked as "RDH" for "Reserved Driven High" in the attribute phase of the transaction of FIG. 8.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

I claim:

1. A method of providing a distributed peer-to-peer transaction between a requester device and a completer device, the method comprising the steps of:
   inserting completer device address data into the distributed peer-to-peer transaction;
   inserting self-defining payload data into a data phase of the distributed peer to-peer transaction, wherein the self-defining payload data enables the completer device to identify the format, structure, and content of the payload data; and
   sending the distributed peer-to-peer transaction over an interconnect bus of a computer system according to an interconnect protocol.

2. The method of claim 1, further comprising the step of:
   inserting a peer-to-peer command into a command phase of the distributed peer-to-peer transaction.

3. The method of claim 1, further comprising the step of:
   setting an attribute in an attribute phase of the distributed peer-to-peer transaction, the attribute indicating the distributed peer-to-peer transaction is a peer to-peer transaction.

4. The method of claim 1, the step of inserting completer device address data comprising the step of:
   inserting the completer device address data into the address phase of the distributed peer-to-peer transaction.

5. The method of claim 1, the step of inserting completer device address data comprising the step of:
   inserting a bus number associated with the completer device's location in a bus hierarchy; and
   inserting a device identifier associated with the completer device.

6. The method of claim 5, the step of inserting completer device address data further comprising the step of:
   inserting a function identifier associated with the completer device.

7. The method of claim 1, further comprising the step of:
   obtaining the completer device address data from a device driver of the operating system associated with the requester device.

8. The method of claim 1, wherein the interconnect protocol is the PCI-X interconnect protocol.

9. The method of claim 1, the step of inserting a self-defining payload data into a data phase of the distributed peer-to-peer transaction comprising the step of:
   setting an attribute in an attribute phase to indicate the presence of self-defining payload data in the data phase.

10. The method of claim 1, further comprising the step of:
    routing the distributed peer-to-peer transaction across a hierarchy of interconnect bus segments using the completer device address data.

11. The method of claim 1, further comprising the step of:
    obtaining a handle from a device driver of an operating system associated with the requester device, wherein the handle indicates permission by the operating system for peer-to-peer transactions between the requester device and the completer device.

12. The method of claim 11, further comprising the step of:
    inserting the handle into an attribute phase of the distributed peer-to-peer transaction.

13. The method of claim 11, the step of inserting completer device attribute data comprising the step of:
inserting the handle in the data phase of the distributed peer-to-peer transaction.

14. The method of claim 11, the step of obtaining a handle from a device driver of an operating system comprising the step of:
requesting the handle from a device driver associated with the requester prior to sending the distributed peer-to-peer transaction.

15. The method of claim 11, the step of obtaining a handle from a device driver of an operating system comprising the step of:
requesting the handle from a device driver associated with the completer upon receiving the distributed peer-to-peer transaction.

16. The method of claim 1, further comprising the step of:
inserting an address in a completer device address space into the data phase of the distributed peer-to-peer transaction.

17. The method of claim 1, the self-defining payload data comprising:
an information field; and
a definition field, the definition field providing structure and content definition data for the information field.

18. A computer system comprising:
a central processing unit connected to a host bus;
a random access memory connected to a system memory bus;
an interconnect bus operating according to an interconnect protocol;
a core logic chip coupled as a first interface bridge between the host bus and the system memory bus, as a second interface bridge between the host bus and the interconnect bus, and as a third interface bridge between the system memory bus and the interconnect bus; and
a first device coupled to the interconnect bus, the first device operating according to an interconnect protocol, the first device adapted to provide a plurality of phases in an interconnect transaction, the interconnect transaction comprising:
completer device address data; and
self-defining payload data in a data phase of the interconnect transaction, wherein the self-defining payload data enables a second device to identify the format, structure, and content of the payload data.

19. The computer system of claim 18, the interconnect transaction further comprising:
a command, the command contained in a first phase of the interconnect transaction, the command identifying the interconnect transaction as a peer-to-peer interconnect transaction.

20. The computer system of claim 18, the interconnect transaction further comprising:
an attribute phase, the attribute phase identifying the interconnect transaction as a peer-to-peer interconnect transaction.

21. The computer system of claim 18, wherein the interconnect bus is a PCI-X bus, and wherein the command is issued on a C/BE# portion of the PCI-X bus.

22. The computer system of claim 18, the completer device address data is inserted into an address phase of the interconnect transaction.

23. The computer system of claim 18, wherein the interconnect bus is a PCI-X bus.

24. The computer system of claim 18, the self-defining payload data comprising:
an information field; and
a definition field, the definition field providing structure and content definition data for the information field.

25. The computer system of claim 18, the interconnect transaction further comprising:
an attribute phase, the attribute phase indicating the presence of a self-defining payload data in the data phase.

26. The computer system of claim 18, further comprising:
an operating system for controlling the central processing unit, the operating system granting permission for the interconnect transaction.

27. The computer system of claim 26, further comprising:
a requester device driver coupled to the operating system and the requester device, the requester device driver obtaining a handle from the operating system, the handle indicating permission for the interconnect transaction with the completer device, the requester device driver passing the handle to the requester device, the handle inserted into the data phase of the interconnect transaction by the requester device.

28. The computer system of claim 26, further comprising:
a completer device driver coupled to the operating system and the completer device, the completer device driver obtaining a handle from the operating system, the handle indicating permission for the interconnect transaction with the completer device, the completer device driver passing the handle to the completer device upon receipt of the interconnect transaction by the completer device.

29. The computer system of claim 28, wherein the completer device requests the handle from the completer device driver.

30. The computer system of claim 18, the interconnect transaction further comprising:
an address in a completer device address space, the address inserted into the data phase of the interconnect transaction.

31. The computer system of claim 18,
wherein the interconnect bus is organized into a hierarchy of interconnect bus segments, the hierarchy of interconnect bus segments coupled by interconnect bus bridges, and
wherein the interconnect transaction is routed between interconnect bus segments using the completer device address data.

32. The computer system of claim 18, further comprising:
a completer device driver coupled to an operating system of the computer system and the completer device, the completer device driver providing an address in a completer device address space corresponding to the requester device for use by the completer device in processing interconnect transactions from the requester device.

33. A computer system comprising:
a processor;
a random access memory coupled to the processor;
an interconnect bus coupled to the processor and the random access memory, the interconnect bus operating according to an interconnect protocol; and
a requester device coupled to the interconnect bus, the requester device adapted to generate interconnect bus transactions to a completer device coupled to the interconnect bus, the requester device and the completer device operating according to the interconnect protocol, the transactions comprising:
means for indicating a completer device;
payload data; and
means for converting the payload data into a completer device format, wherein the means for converting payload data enables the completer device to identify the format, structure, and content of the payload data.

34. The computer system of claim 33, the means for indicating a completer device comprising:
means for routing the interconnect bus transaction from the requester device to the completer device across a hierarchy of bus segments.

35. The computer system of claim 33, the payload data having a transaction format, the means for converting comprising:
means for interpreting the transaction format.

36. The computer system of claim 33, the payload data having an internal structure, the means for converting comprising:
means for interpreting the internal structure of the payload data.

37. The computer system of claim 33, the payload data having a type, the means for converting comprising:
means for interpreting the type of the payload data.

* * * * *

UNITED STATES PATENT AND TRADEMARK OFFICE
CERTIFICATE OF CORRECTION

PATENT NO. : 7,028,132 B2  Page 1 of 1
APPLICATION NO. : 09/967607
DATED : April 11, 2006
INVENTOR(S) : Dwight D. Riley It is certified that error appears in the above-identified patent and that said Letters Patent is hereby corrected as shown below:

In column 3, line 46, delete "PCI/IDF" and insert -- PCI/IDE --, therefor.

In column 8, line 12, in Claim 1, delete "peer to-peer" and insert -- peer-to-peer --, therefor.

In column 8, line 25, in Claim 3, delete "peer to-peer" and insert -- peer-to-peer --, therefor.

In column 8, line 48, in Claim 9, after "inserting" delete "a".

In column 9, line 63, in Claim 22, insert -- wherein -- before "the completer".

In column 10, line 9, in Claim 25, after "presence of" delete "a".

Signed and Sealed this

Fourteenth Day of April, 2009

JOHN DOLL
*Acting Director of the United States Patent and Trademark Office*